(12) United States Patent
Lim

(10) Patent No.: US 7,916,512 B2
(45) Date of Patent: Mar. 29, 2011

(54) MEMORY MODULE HAVING HIGH DATA PROCESSING RATE

(75) Inventor: Gwang-Man Lim, Seoul (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 761 days.

(21) Appl. No.: 11/871,913

(22) Filed: Oct. 12, 2007

(65) Prior Publication Data

US 2008/0189475 A1 Aug. 7, 2008

(30) Foreign Application Priority Data

Feb. 1, 2007 (KR) ........................ 10-2007-0010575

(51) Int. Cl.
*G11C 13/04* (2006.01)
*G01J 1/32* (2006.01)

(52) U.S. Cl. ..................... 365/64; 365/189.08; 250/205; 250/214

(58) Field of Classification Search .................... 365/64, 365/101, 105, 189.05, 189.08, 226, 230.06; 250/201.1, 214.1, 551, 205, 214
See application file for complete search history.

(56) References Cited

U.S. PATENT DOCUMENTS

| | | | |
|---|---|---|---|
| 5,283,885 A | 2/1994 | Hollerbauer | |
| 6,496,304 B2 * | 12/2002 | Shiozaki et al. | 359/341.43 |
| 6,573,567 B1 | 6/2003 | Nishizawa et al. | |
| 7,092,308 B2 | 8/2006 | Choi et al. | |
| 7,093,766 B2 | 8/2006 | Obana et al. | |
| 2004/0047169 A1 | 3/2004 | Lee et al. | |
| 2005/0013106 A1 | 1/2005 | Takiar | |
| 2006/0108510 A1 * | 5/2006 | Draper et al. | 250/214.1 |

FOREIGN PATENT DOCUMENTS

| | | |
|---|---|---|
| JP | 09-330387 | 12/1997 |
| JP | 2000-3424 | 1/2001 |
| JP | 2001-160125 | 6/2001 |
| JP | 2004-259304 | 9/2004 |
| KR | 1999-0083261 | 11/1999 |
| KR | 10-2004-0033750 | 5/2004 |
| KR | 20-0362446 | 9/2004 |
| KR | 10-2005-005422 | 1/2005 |
| KR | 10-2005-0074161 | 7/2005 |
| KR | 10-2005-0121647 | 12/2005 |

OTHER PUBLICATIONS

English language abstract of Korean Publication No. 1999-0083261.

(Continued)

*Primary Examiner* — Richard Elms
*Assistant Examiner* — Hien N Nguyen
(74) *Attorney, Agent, or Firm* — Myers Bigel Sibley & Sajovec, P.A.

(57) ABSTRACT

A memory module having a high data processing rate and high capacity is provided. The memory module may include a memory chip, a controller controlling an operation of the memory chip, an optical detector converting an external input signal into an internal input signal to transmit the converted signal to the controller, and an optical generator converting an internal output signal received from the controller into an external output signal. The optical detector converts an external input optical signal into an internal input signal to transmit the converted signal to the controller. The optical generator converts an internal output signal received from the controller into an external output optical signal.

18 Claims, 7 Drawing Sheets

OTHER PUBLICATIONS

English language abstract of Japanese Publication No. 2000-3424.
English language abstract of Japanese Publication No. 2001-160125.
English language abstract of Korean Publication No. 10-2004-0033750.
English language abstract of Japanese Publication No. 2004-259304.
English language abstract of Korean Publication. No. 10-2005-0074161.
English language abstract of Korean Publication No. 10-2005-0121647.

* cited by examiner

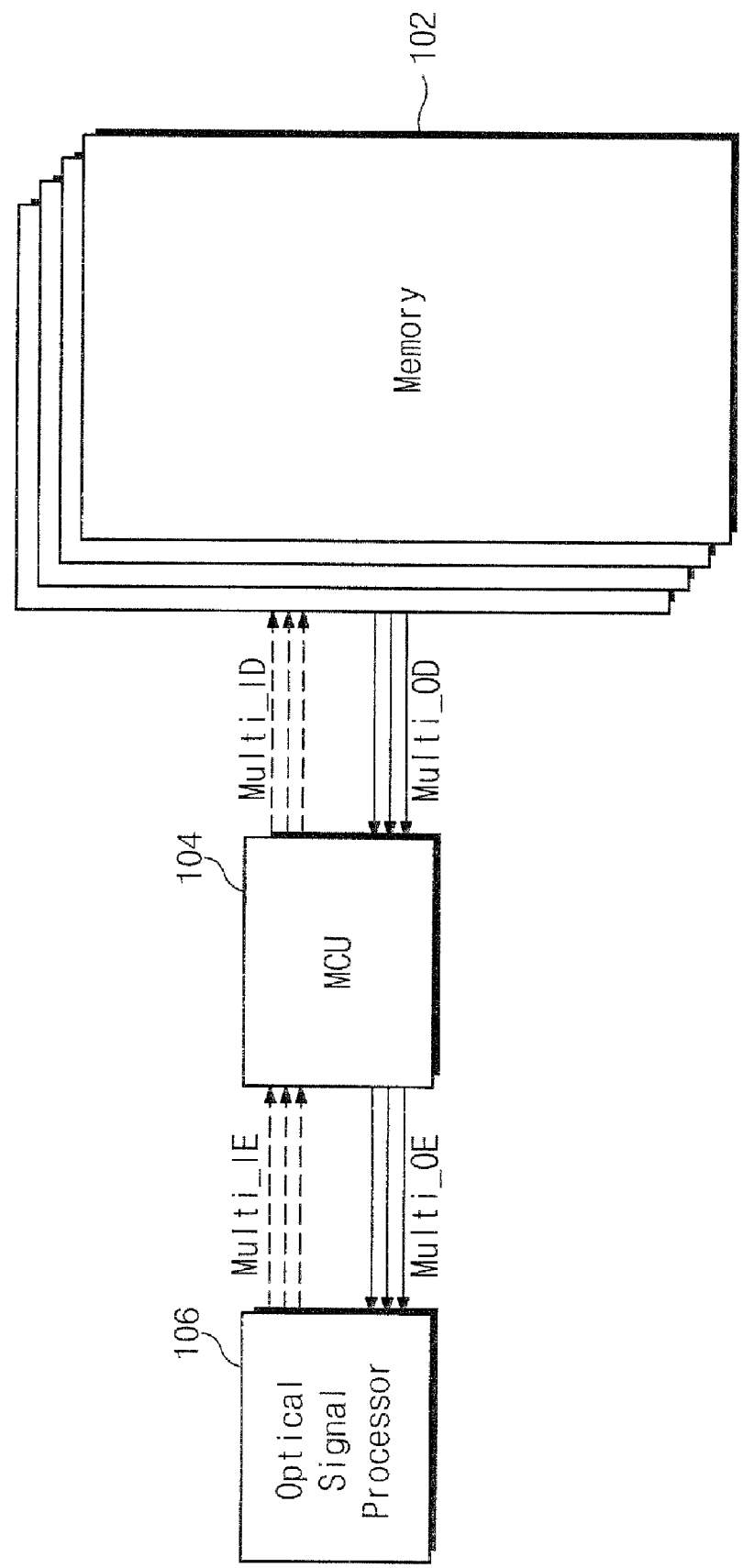

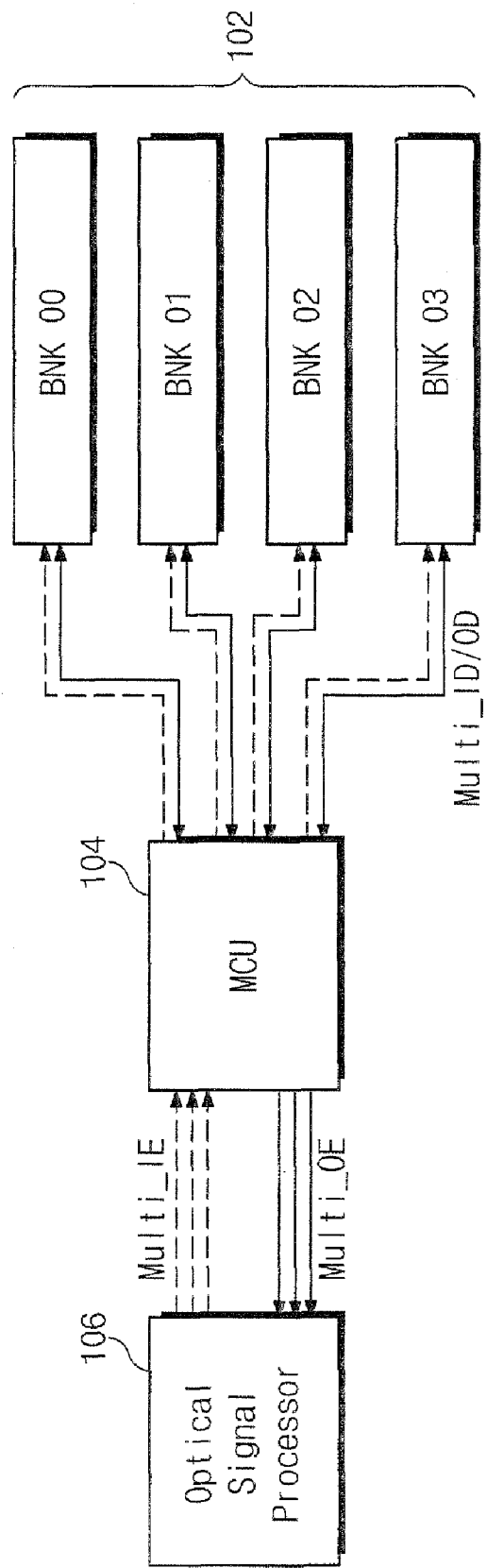

MEMORY MODULE HAVING HIGH DATA PROCESSING RATE

CROSS-REFERENCE TO RELATED APPLICATIONS

This U.S. non-provisional patent application claims priority under 35 U.S.C. §119 of Korean Patent Application No. 2007-10575, filed on Feb. 1, 2007, the entire contents of which are hereby incorporated by reference.

BACKGROUND

The present invention disclosed herein relates to a semiconductor substrate, and more particularly, to a memory module capable of storing data.

As portable devices become popular, memory modules with low power consumption and compact sizes are widely used as storage devices. Therefore, various memory cards having flash memory chips have been introduced as storage devices. Examples of the memory cards are a MultiMedia Card (MMC), a secure digital card (SD card), and a flash card.

Although the memory modules are widely used and have a low data capacity and a low data processing rate, a fast data processing rate is highly advantageous as the data capacity of these memory modules increases.

SUMMARY

Embodiments of the present invention provide a memory module having a high data processing rate along with a high capacity.

Additionally, other embodiments of the present invention provide memory modules inputting/outputting data using an optical signal. In one embodiment, a memory module includes a memory chip, a controller controlling an operation of the memory chip, an optical detector converting an external input signal into an internal input signal to transmit the converted signal to the controller, and an optical generator converting an internal output signal received from the controller into an external output signal. The optical detector converts an external input optical signal into an internal input signal to transmit the converted signal to the controller. The optical generator converts an internal output signal received from the controller into an external output optical signal.

In some embodiments, the memory modules exchange data with an external device using an optical signal to remarkably increase a data transfer rate compared to the case where data are processed using an electrical signal.

In other embodiments, the memory modules divide light based on wavelength to input/output data through a multi-channel using an optical signal. Therefore, a data transfer rate and a data processing capacity increase, thereby remarkably improving a data processing rate.

In still other embodiments, the memory modules receive power from an external power supply or a built-in battery. The external power supply and the built-in battery are automatically converted. Accordingly, accidental loss of data can be prevented because the memory modules are operated using the built-in battery when a power failure suddenly occurs.

BRIEF DESCRIPTION OF THE FIGURES

The accompanying figures are included to provide a further understanding of the present invention, and are incorporated in and constitute a part of this specification. The drawings illustrate exemplary embodiments of the present invention and, together with the description, serve to explain principles of the present invention. In the figures:

FIGS. 6 and 7 are block diagrams of memory modules according to various embodiments of the present invention.

DETAILED DESCRIPTION

Figure 1:
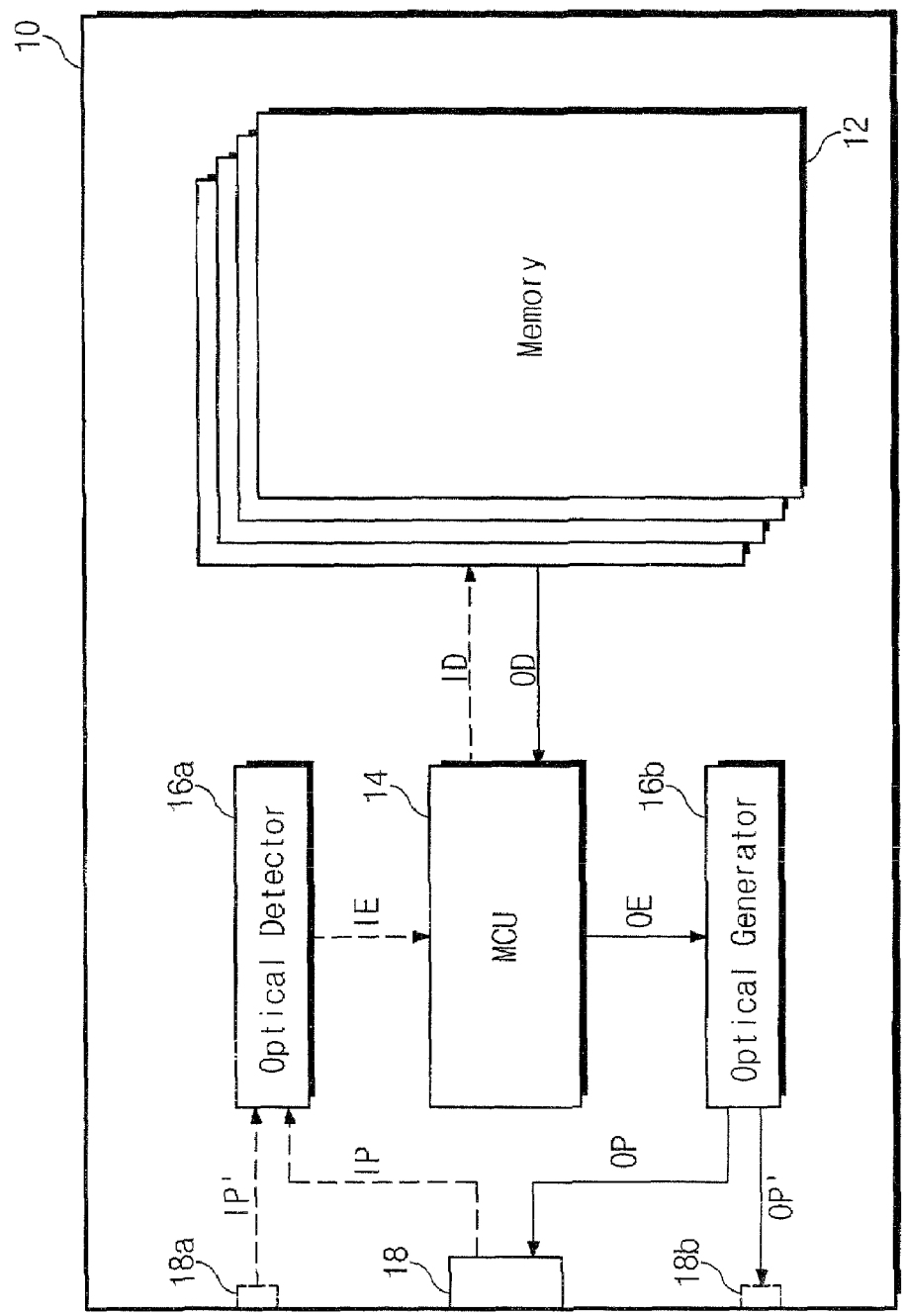
FIGS. 1 through 5 are block diagrams of memory modules according to embodiments of the present invention.

Exemplary embodiments of the present invention will be described below in more detail with reference to FIGS. 1 through 7. The present invention may, however, be embodied in different forms and should not be constructed as limited to the embodiments set forth herein. Rather, these embodiments are provided so that this disclosure will be thorough and complete, and will fully convey the scope of the present invention to those skilled in the art. Like reference numerals refer to like elements throughout.

FIG. 1 is a block diagram of a memory module according to an embodiment of the present invention.

Referring to FIG. 1, the memory module 10 of this embodiment includes a memory chip 12, a controller 14, an optical detector 16a, and an optical generator 16b. The controller 14 controls an overall operation of the memory module 10. A micro controller unit (MCU) may be used as the controller 14. The controller 14 may be formed integrally with the memory module 10 or separately.

The optical detector 16a converts an optical signal (an external input optical signal) IP received from an external source (not shown) into an internal input signal IE to transmit the converted signal to the controller 14. The optical generator 16b converts an internal output signal OE received from the controller 14 into an external output optical signal OP.

The controller 14 inputs a data signal ID into the memory chip 12 in response to the internal input signal IE received from the optical detector 16a. Also, the controller 14 transmits the internal output signal OE to the optical generator 16b in response to a data signal OD outputted from the memory chip 12.

The memory module 10 may include optical input/output terminals 18. In the external input/output terminals 18, the optical input terminal 18a and the optical output terminal 18b may be formed integrally with the memory module 10 or separately. External input/output optical signals IP' and OP' are transmitted through the external input/output terminals.

The optical detector 16a converts an optical signal into an electrical signal. The optical detector 16a may include a photodiode. The optical detector 16a may include an optical filter and an optical amplifier. The optical generator 16b converts an electrical signal into an optical signal. The optical generator 16b may include a light-emitting diode.

Figure 2:
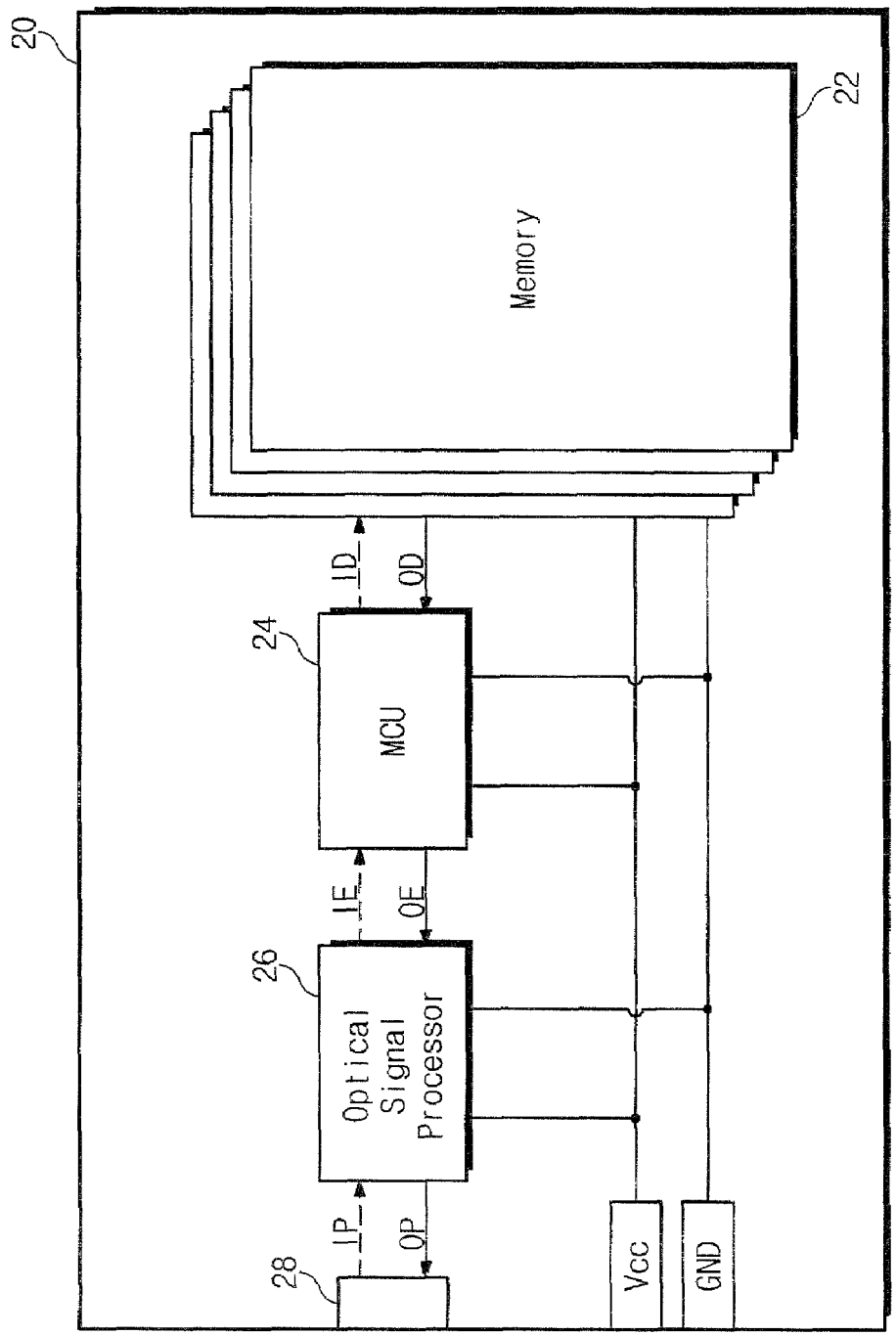

FIG. 2 is a block diagram of a memory module according to another embodiment of the present invention.

Referring to FIG. 2, the memory module 20 of this embodiment includes a memory chip 22, a controller 24, an optical signal processor 26, and power supply terminals Vcc and GND.

The power supply terminals Vcc and GND may be electrically connected to an external power source through an appliance (not shown).

The controller 24 controls an overall operation of the memory module 20. The controller 24 may be implemented using a micro controller unit (MCU). The controller 24 may be formed integrally with the memory module 20 or separately.

The optical signal processor 26 may include the optical detector 16a and the optical generator 16b shown in the embodiment illustrated in FIG. 1. The optical signal processor 26 converts an optical signal (an external input optical signal) IP received from an external source (not shown) into an internal input signal IE to transmit the converted signal to the controller 24. Also, the optical signal processor 26 converts an internal output signal OE received from the controller 24 into an external output optical signal OP.

The controller 24 inputs a data signal ID into the memory chip 22 in response to the internal input signal IE received from the optical signal processor 26. Also, the controller 24 transmits the internal output signal OE to the optical signal processor 26 in response to a data signal OD outputted from the memory chip 22.

The memory module 20 may include an optical input/output terminal 28. In the external input/output terminal 28, the optical input terminal and the optical output terminal may be formed integrally with the memory module 20 or separately as described in the above embodiment. The optical signal processor 26 converts an optical signal into an electrical signal and converts an electrical signal into an optical signal, and may include a photodiode and a light-emitting diode. The optical signal processor 26 may further include an optical filter and an optical amplifier.

Figure 3:
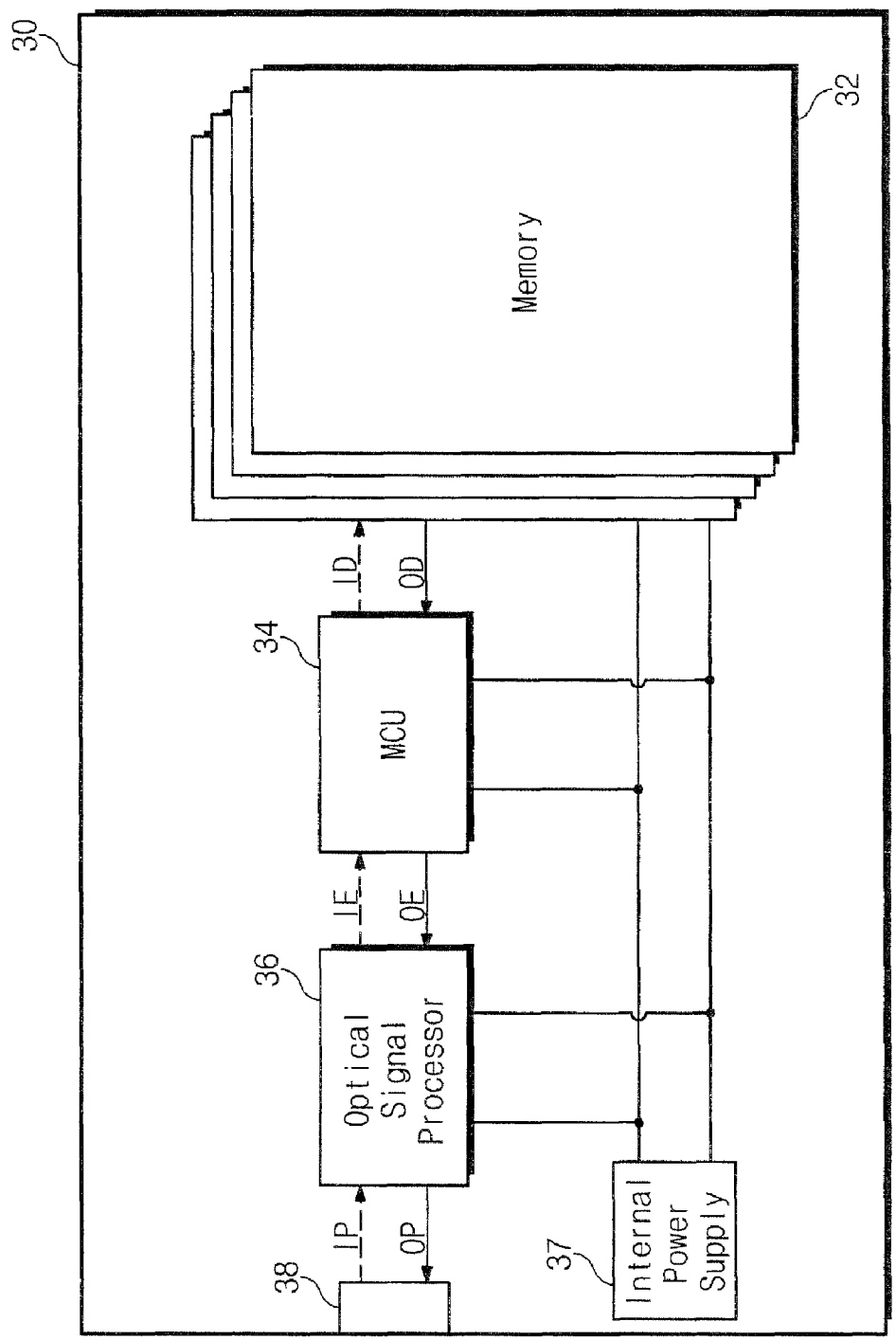

FIG. 3 is a block diagram of a memory module according to yet another embodiment of the present invention.

Referring to FIG. 3, the memory module 30 of this embodiment includes a memory chip 32, a controller 34, an optical signal processor 36, and an internal power supply 37. The internal power supply 37 built in the memory module 30 is a built-in battery. The internal power supply 37 may be an exchangeable or chargeable battery. When the internal power supply 37 is the chargeable battery (not shown), the battery may be connected to an appliance or an auxiliary charger (not shown) for charging.

The controller 34 controls an overall operation of the memory module 30. The controller 34 may be a micro controller unit (MCU). The controller 34 may include a single chip or a plurality of chips.

The optical signal processor 36 may include the optical detector 16a and the optical generator 16b shown in the embodiment illustrated in FIG. 1. The optical signal processor 36 converts an optical signal (an external input optical signal) IP received from an external source (not shown) into an internal input signal IE to transmit the converted signal to the controller 34. Also, the optical signal processor 36 converts an internal output signal OE received from the controller 34 into an external output optical signal OP.

The controller 34 inputs a data signal ID into the memory chip 32 in response to the internal input signal IE received from the optical signal processor 36. Also, the controller 34 transmits the internal output signal OE to the optical signal processor 36 in response to a data signal OD outputted from the memory chip 32.

The memory module 30 may include an optical input/output terminal 38. In the external input/output terminal 38, the optical input terminal and the optical output terminal may be formed integrally with the memory module 30 or separately as described above. The optical signal processor 36 converts an optical signal into an electrical signal and may include a photodiode and a light-emitting diode. The optical signal processor 36 may further include an optical filter and an optical amplifier.

Figure 4:
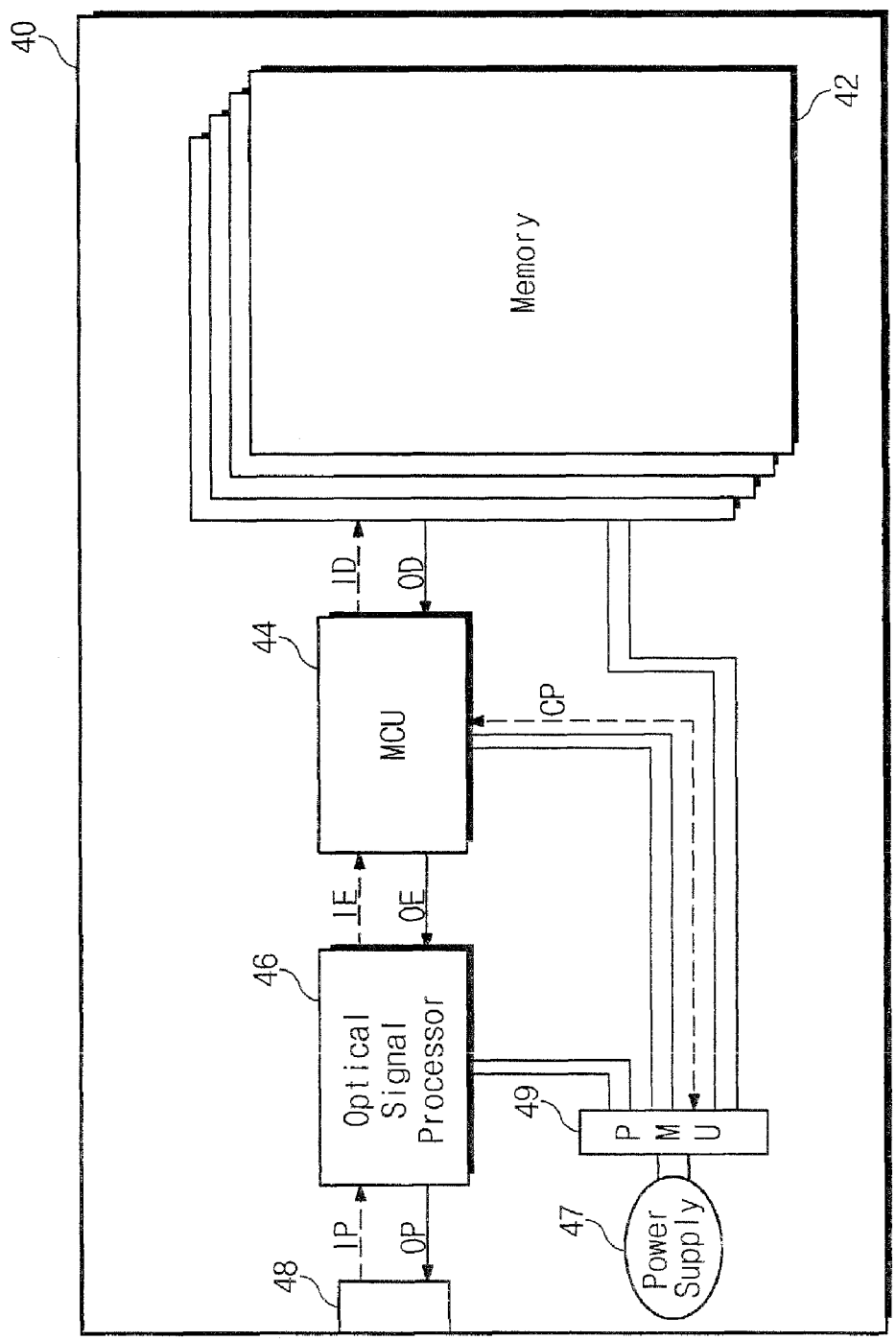

FIG. 4 is a block diagram of a memory module according to still another embodiment of the present invention.

Referring to FIG. 4, the memory module 40 of this embodiment includes a memory chip 42, a controller 44, an optical signal processor 46, an internal power supply 47, and a power management unit (PMU) 49. The internal power supply 47 may be formed in a manner identical to that of the embodiments illustrated in FIGS. 2 and 3. The internal power supply 47 may be electrically connected to an external power source (not shown) through an appliance or may be a battery built in the memory module 40. When the internal power supply 47 is the built-in battery, the battery may be an exchangeable and chargeable battery. When the internal power supply 47 is the chargeable battery, the battery may be connected to an appliance or an auxiliary charger for charging.

Under the control of the controller 44, the PMU 49 selectively supplies an internal power to the optical signal processor 46, the controller 44, and the memory chip 42. As a result, unnecessary power consumption is reduced, which extends the operating time of the battery of the appliance and the battery built-in the memory module.

The controller 44 controls an overall operation of the memory module 40. The controller 44 may be a micro controller unit (MCU). The controller 44 may be formed integrally with the memory module 40 or separately.

The optical signal processor 46 may include the optical detector 16a and the optical generator 16b shown in the embodiment illustrated in FIG. 1. The optical signal processor 46 converts an optical signal (an external input optical signal) IP received from an external into an internal input signal IE to transmit the converted signal to the controller 44. Also, the optical signal processor 46 converts an internal output signal OE received from the controller 44 into an external output optical signal OP.

The controller 44 inputs a data signal ID into the memory chip 42 in response to the internal input signal IE received from the optical signal processor 46. Also, the controller 44 transmits the internal output signal OE to the optical signal processor 46 in response to a data signal OD outputted from the memory chip 42.

The memory module 40 may include an optical input/output terminal 48. In the external input/output terminal 48, the optical input terminal and the optical output terminal may be formed integrally with the memory module 40 or separately as described above. The optical signal processor 46 converts an optical signal into an electrical signal and may include a photodiode and a light-emitting diode. The optical signal processor 46 may further include an optical filter and an optical amplifier.

Figure 5:
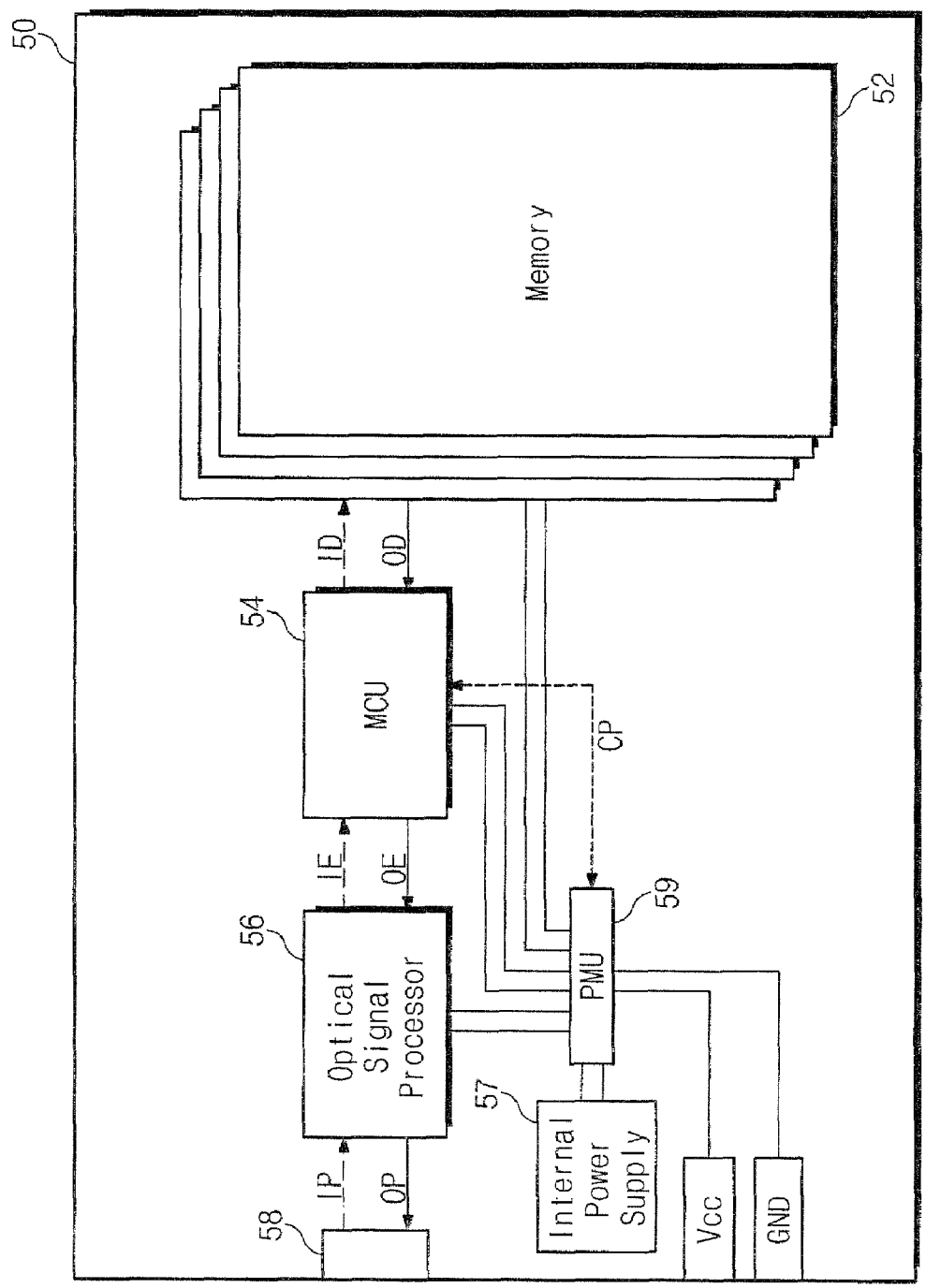

FIG. 5 is a block diagram of a memory module according to another embodiment of the present invention.

Referring to FIG. 5, the memory module 50 of this embodiment includes a memory chip 52, a controller 54, an optical signal processor 56, power supply terminals Vcc and GND, an internal power supply 57, and a power management unit (PMU) 59.

The power supply terminals Vcc and GND may be electrically connected to an external power source (not shown) through an appliance. The internal power supply 57 may be an exchangeable and chargeable battery. When the internal power supply 57 is the chargeable battery, the battery may be connected to an appliance or an auxiliary charger for charging.

Under the control of the controller 54, the PMU 59 selectively supplies an internal power to the optical signal processor 56, the controller 54, and the memory chip 52. As a result, unnecessary power consumption is reduced to extend the operating time of the battery of the appliance and the battery built in the memory module.

The PMU 59 manages an external power through power supply terminals Vcc and GND to supply the power when the power is supplied from the external power supply. The PMU 59 manages the internal power supply 57 to supply a power when the external power is intercepted. Accordingly, in a situation where a power failure suddenly occurs while the memory module is operated using the external power supply, accidental loss of data can be prevented because the memory module can be operated using the internal power supply 57. When the memory module is not used, the memory module may be changed to a power saving mode to reduce the energy consumption of the internal power supply 57.

The controller 54 controls an overall operation of the memory module 50. The controller 54 may be a micro controller unit (MCU). The controller 54 may be formed integrally with the memory module 50 or separately.

The optical signal processor 56 may include the optical detector 16a and the optical generator 16b shown in the embodiment illustrated in FIG. 1. The optical signal processor 56 converts an optical signal (an external input optical signal) IP received from an external into an internal input signal IE to transmit the converted signal to the controller 54. Also, the optical signal processor 56 converts an internal output signal OE received from the controller 54 into an external output optical signal OP.

The controller 54 inputs a data signal ID into the memory chip 52 in response to the internal input signal IE received from the optical signal processor 56. Also, the controller 54 transmits the internal output signal OE to the optical signal processor 56 in response to a data signal OD outputted from the memory chip 52.

The memory module 50 may include an optical input/output terminal 58. In the external input/output terminal 58, the optical input terminal and the optical output terminal may be formed integrally with the memory module 50 or separately as described above. The optical signal processor 56 converts an optical signal into an electrical signal. The optical signal processor 56 may include a photodiode and a light-emitting diode. The optical signal processor 56 may include an optical filter and an optical amplifier.

In the above and other embodiments of the present invention, the memory module may include a plurality of chips. Therefore, the memory module of the present invention can process a large amount of data.

FIG. 6 is a block diagram of a memory module according various example embodiments of the present invention.

Referring to FIG. 6, the memory module includes a plurality of chips 102. Also, the memory module may include multi-channel data paths because the memory module can exchange data with external devices using an optical signal. External input optical signals are inputted to an optical signal processor 106 as wavelength-division-multiplexed multi-channel signals. The optical signal processor 106 divides the external input optical signals according to a plurality of channels based on frequency, amplifies the divided signals, and converts the amplified signals into electrical signals to transmit multi-channel internal input signals Multi_IE to a controller 104. The optical signal processor 106 includes an optical filter, an optical amplifier, and an optical detector. The optical signal processor 106 divides multi-channel internal output signals Multi_OE into multi-channel optical signals to generate external output optical signals. Therefore, the optical signal processor 106 may further include a channel distributor and an optical generator.

The controller 104 transmits divided data signals Multi_ID to memory chips 102 in response to the multi-channel internal input signals Multi_IE transmitted from the optical signal processor 106. The divided data signals Multi_ID are synchronized with a data input clock and distributed to the memory chips 102 by time-division multiplexing. Also, the controller 104 converts a plurality of data signals Multi_OD transmitted from the memory chips into the multi-channel internal output signals Multi_OE, and then transmits the converted signals to the optical signal processor 106 when reading data from the memory chips.

The memory module of the present invention distributes data to the memory chips to process a large amount of data without a data input time delay when the clock frequency of an appliance is greater than that of the memory chips.

Referring to FIG. 7, a memory chip 102 may include a plurality of memory regions BNKn. The memory regions BNKn may be memory regions logically defined in a single memory chip. On the other hand, the memory regions BNKn may include a plurality of memory chips, which are physically separated from each other. Data received through multi-channels are distributed into and stored in the plurality of memory regions BNKn. Data outputted from the plurality of memory regions BNKn are outputted to an external circuit through the multi-channels.

As described above, the data can be inputted/outputted using the optical signal to remarkably increase the data transfer rate between the appliance and the memory module.

Using a multi-channel characteristic of the optical signal, a large amount of data can be inputted/outputted simultaneously, thereby improving a data processing capacity.

The data transfer rate and the data processing capacity increase using the optical signal and the multi-channel, thereby remarkably improving a data processing rate.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A memory module comprising:
a memory chip;
a controller controlling an operation of the memory chip;
an optical detector converting an external input optical signal into an internal input signal to transmit the converted signal to the controller;
an optical generator converting an internal output signal received from the controller into an external output optical signal; and
optical input/output terminals receiving the external input optical signal from an appliance and outputting the external output optical signal to the appliance, respectively,
wherein the optical input/output terminals are integrally formed.

2. The memory module of claim 1, further comprising a power supply supplying an internal power to the memory chip, the controller, the optical detector, and the optical generator.

3. The memory module of claim 2, wherein the power supply comprises terminals electrically connected to an external power.

4. The memory module of claim 2, wherein the power supply is a built-in battery.

5. The memory module of claim 2, wherein the power supply comprises:
terminals electrically connected to the external power; and
a built-in battery.

6. The memory module of claim 5, further comprising a power management unit connected to the power supply to automatically convert the external power into the internal power when a power failure suddenly occurs.

7. The memory module of claim 6, wherein the power management unit is controlled by the controller to adjust a voltage supplied to the memory chip, the optical detector, and the optical generator.

8. The memory module of claim 1, further comprising an optical signal processor including the optical detector and the optical generator, wherein the optical signal processor processes a multi-channel optical signal.

9. The memory module of claim 8, wherein the external input optical signal is inputted through a multi-channel data path, and the optical signal processor divides a multi-channel optical signal received over the multi-channel data path, converts the divided signal into a plurality of internal input signals, and transmits the converted signals to the controller.

10. The memory module of claim 9, wherein the memory chip comprises a plurality of memory regions and the controller distributes the plurality of internal input signals to the memory regions.

11. The memory module of claim 8, wherein the memory chip comprises a plurality of memory regions and the controller transmits a plurality of internal output signals to the optical signal processor in response to a plurality of data signals outputted from the memory regions.

12. The memory module of claim 11, wherein the optical signal processor converts the plurality of internal output signals into multi-channel external output optical signals.

13. The memory module of claim 11, wherein the memory regions are regions formed by logically dividing a single memory chip.

14. The memory module of claim 11, wherein the memory regions are a plurality of physically divided memory chips.

15. A memory module comprising:
a memory chip;
a controller controlling an operation of the memory chip;
an optical detector converting an external input optical signal into an internal input signal to transmit the converted signal to the controller;
an optical generator converting an internal output signal received from the controller into an external output optical signal; and
optical input/output terminals receiving the external input optical signal from an appliance and outputting the external output optical signal to the appliance, respectively, wherein the optical input/output terminals are separately formed.

16. A memory module comprising:
at least one memory chip, the memory chip including at least one memory region;
an optical input terminal configured to receive an optical data signal;
an optical detector configured to convert the received optical data signal into an electrical input signal, the optical detector including an optical filter and an optical amplifier;
a controller configured to control data signals input to the memory chip and output from the memory chip, the controller configured to receive the converted electrical input signal and transmit an internal electrical input signal to the memory chip and configured to receive an internal electrical output signal from the memory chip and transmit an electrical output signal;
an optical generator configured to receive the transmitted electrical output signal from the controller and convert the electrical output signal into an optical data signal; and
an optical output terminal configured to transmit the optical data signal out of the memory module.

17. The memory module of claim 16, wherein optical detector includes a photodiode and the optical generator includes a light-emitting diode.

18. The memory module of claim 16, further comprising a power supply supplying an internal power to the memory chip, the controller, the optical detector, and the optical generator.

* * * * *